United States Patent [19]
Chase

[11] 4,088,332
[45] May 9, 1978

[54] INTERNAL EXPANDING COLLET CLAMP

[76] Inventor: Russell C. Chase, 6626 Guhn Rd., Houston, Tex. 77040

[21] Appl. No.: 787,331

[22] Filed: Apr. 14, 1977

[51] Int. Cl.² ............................................. B23B 31/40
[52] U.S. Cl. ........................................ 279/2 R; 82/44
[58] Field of Search ................... 279/2 R, 2 A; 82/44; 269/48.1; 242/72.1

[56]  References Cited
U.S. PATENT DOCUMENTS 3,716,246  2/1973  Peterson ............................. 279/2 R Primary Examiner—Gil Weidenfeld
Attorney, Agent, or Firm—Carl B. Fox, Jr.

[57] ABSTRACT

Internal expanding collet clamp, wherein collet elements are moved axially over a cone to be expanded within a workpiece. The collet elements are fully supported when expanded. The clamp is actuated by a drawbar in the usual manner.

14 Claims, 7 Drawing Figures

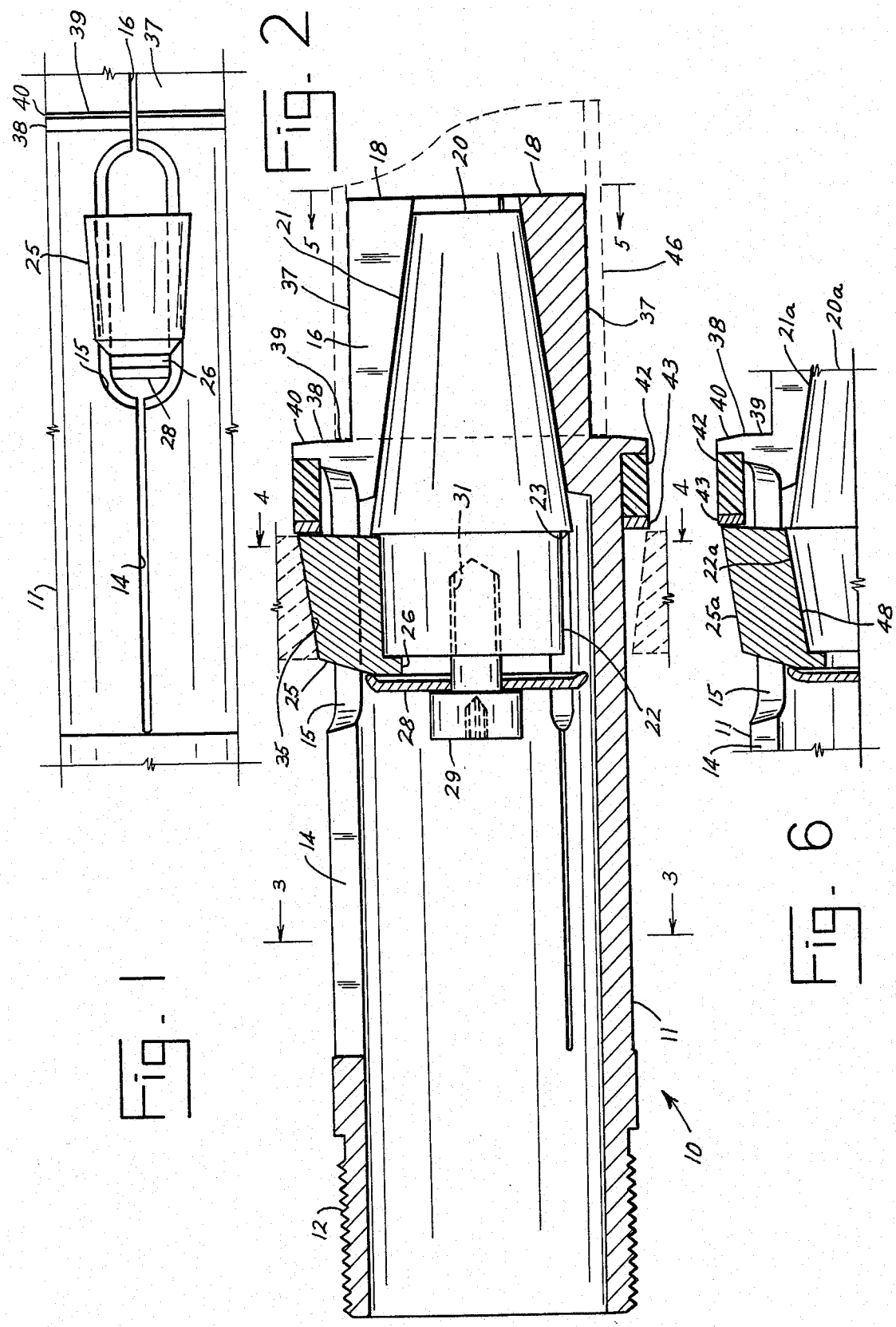

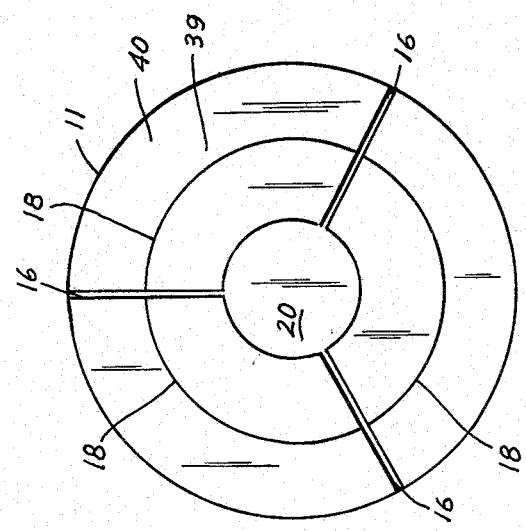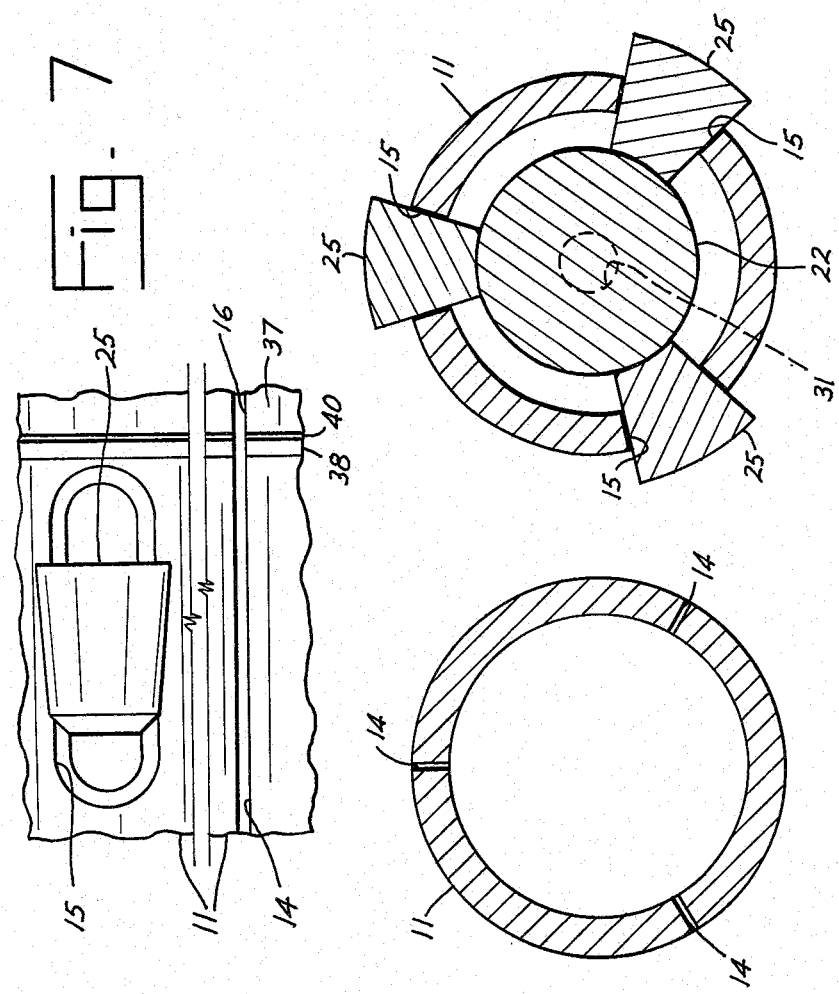

INTERNAL EXPANDING COLLET CLAMP

BACKGROUND OF THE INVENTION

Available internal expanding collet clamps are relatively complicated devices, and are relatively expensive. Furthermore, the internal collets which are commercially available are not fully supported when expanded and often do not hold the workpiece in a completely satisfactory manner. This invention provides an internal collet clamp device which solves the foregoing problems.

SUMMARY OF THE INVENTION

This invention provides an internal expanding collet clamp, referred to more simply as an internal collet, in which collet elements adapted to be inserted into a cylindrical opening in the end of a workpiece are expanded by drawing the collet elements axially along a frustoconical member around which the collet elements are disposed. The collet elements are released from the workpiece by movement of the collet elements in the opposite direction along the frustoconical member. The collet elements are provided at one end of a tubular member which is threaded at its opposite end for connection to a drawbar. The frustoconical member is held stationary by tapered inserts which are disposed around the frustoconical member and are seated in a conical support seat, the inserts being disposed through slots in the collet member. In this way, the frustoconical member may be held stationary while the collet member may be moved axially to be expanded or retracted. The inserts may, if desired, be made integral with the frustoconical member but this results in a somewhat weaker apparatus.

A principal object of the invention is to provide an internal expanding collet clamp device which is simple and economical yet which is entirely dependable and accurate in use. Another object of the invention is to provide such a device wherein the collet elements when expanded within a workpiece are fully supported over their entire areas. Still another object of the invention is to provide such a device wherein a central expander cone is supported stationarily against an external support surface and wherein the collet elements are axially movable between the cone and the support surface.

Older forms of internal collet clamps are shown in U.S. Pat. Nos. 2,877,022, 2,929,635, 3,311,383, and 3,490,778.

Other objects and advantages of the invention will appear from the following detailed description of preferred embodiments of the invention, reference being made to the accompanying drawings.

BRIEF DESCRIPTION OF THE DRAWINGS

FIG. 1 is an axial cross section of a preferred embodiment of apparatus according to the invention.

FIG. 2 is a partial plan view of the apparatus shown in FIG. 1.

FIG. 3 is a transverse cross section taken at line 3—3 of FIG. 1.

FIG. 4 is a transverse cross section taken at line 4—4 of FIG. 1.

FIG. 5 is an end elevation of the apparatus shown in FIG. 1, taken at line 5—5 of FIG. 1.

FIG. 6 is a partial axial cross section of a modified form of apparatus according to the invention.

FIG. 7 is a partial plan view of another modified form of the apparatus.

DESCRIPTION OF THE PREFERRED EMBODIMENTS

Referring now to the drawings, the preferred embodiments of the invention will be described. Referring first to FIG. 1 of the drawings, the internal expanding collet clamp shown is referred to generally by reference numeral 10. A generally cylindrical tubular member 11 has external threads 12 at its lefthand end as it is shown in the drawing for screwed connection to the drawbar of a lathe or other similar machine tool. Threads 12 may be provided internally instead of externally, as will be apparent to those skilled in the art. Member 11 has longitudinal slots 14 therealong which are widened at 15. Slots 16 are extensions of slots 14, 15, being in line therewith, and collet elements 18 are formed between slots 16. In the drawing, three slots 14-16 are shown, and three collet elements 18 are shown, but any plurality of slots and collet elements may be used. In the drawing, the slots 14-16 are shown equally circularly spaced and the collet elements 18 are shown of equal arcuate lengths, but it will be realized that the slot spacings may be unequal and the arcuate lengths of the collet elements may be unequal, as desired and as compatible with the intended use.

An internal expander member 20 is disposed within the collet elements 18 and within the widened slot portions 15. Member 20 is of frustoconical form at its portion 21 and is of cylindrical form at its portion 22. A shoulder 23 is provided between the enlarged end of portion 21 and portion 22, but this is not necessary and portion 22 may be either equal to the enlarged end of portion 21 or larger than portion 21. Portion 21 of member 20 expands collet members 18 when the collet members 18 are drawn upwardly of the conical shape of portion 21 by movement of member 11 in a leftward direction as the apparatus is shown in FIG. 1.

Support inserts 25 are disposed against the outer surface of cylindrical portion 22 of member 20, and have inwardly projecting lugs 26 which are disposed against the end of portion 22 and are fixed in place by a washer 28 forced thereagainst by a screw 29 received through the washer and screwed into a concentric tapped opening 31 in the end of member 20. Washer 28 is shown of dished form in order that the edge thereof may firmly engage lugs 26, but a flat washer may be used instead if desired.

The outer surfaces of inserts 25 are of conically beveled form and are adapted to be supported against a correspondingly conically beveled support surface 35 which may be a part of any suitable supporting apparatus. The outer surfaces of inserts 25 may be of other form suitable to be supported against lateral and leftward movements in a seat of an adequate supporting apparatus, as will be apparent to those skilled in the art.

The collet elements 18 have arcuate outer surfaces 37 adapted to engage the interior of a workpiece into which the collet elements are inserted. A shoulder 38 is perpendicular to surfaces 37 at its inner portion 39 and is slightly tapered away from the collet elements at its outer portion 40. The taper may be omitted if desired. Shoulder 38 is, of course, arcuately segmented by slots 16. At its opposite side, the annular projection of shoulder 38 opposite tapered portion 40 is engaged by a ring 42 of elastomeric material. A metal washer 43 is disposed against ring 42 and at its opposite side washer 43 engages inserts 25. The purpose of ring 42 is to cover the ends of slots 15 adjacent the collet elements so that detritus resulting from work done on the workpiece 46 will not enter the slots.

The slots 14–16 may be wider or narrower than shown, and the support inserts 25 may be wider or narrower consistent with the widths of slots 15. The inserts 25 may be connected to member 20 in other manners, for example, inserts 25 may be connected to member 20 by radial screws disposed through holes through the inserts and screwed into tapped openings in member 20. Inserts 25 may be made integral with member 20 by extending slots 14 to the end of body member 11 and making provision for releasably interconnecting the lefthand ends of the segments of member 11. This may be done by screwing the segments to a cylindrical bar placed within the lefthand ends of the segments.

The collet clamp is operated by placing the cylindrical opening of the workpiece, for example, workpiece 46 around the collet elements 18, with inserts 25 supported in a support of the type described, and then drawing member 11 toward the left by means of a drawbar screwed onto the threads of member 11.

Referring now to FIG. 6 of the drawings, showing a modified form of the apparatus, member 11 is the same as in FIGS. 1–5. Member 20a is generally the same as member 20, but is modified so that portion 22a thereof is conically tapered in the opposite direction compared with the taper of portion 21a, which is of the same form as portion 21 of member 20. Inserts 25a are the same as inserts 25 except that they are conically tapered at their inner surfaces 48 to fit the taper of portion 22a. This relieves the lugs 26a of the leftward force imposed by member 20a when the collet elements are drawn toward the left. The FIG. 6 apparatus is used in the same manner as the apparatus shown in FIGS. 1–5.

It will be understood that the apparatus provided according to the invention is of simple structure yet is very dependable and accurate in use. The collet elements of both forms of the apparatus are fully supported at all times so that they are not placed under strain during use. Because of the fact that the slots 14–16 extend almost the full length of the apparatus, such bending of the collet structures as takes place during expansion and contraction is spread over an elongated strip of metal so that no severe bending occurs at any point along its length. The tapered elements can be made of any desired tapers in order to obtain the expansion forces necessary.

When the clamp is expanded within a workpiece, the elastomeric ring 42 is compressed by movement of shoulder 38 toward the left. The compressive force of the ring assists in moving member 11 toward the right when the clamp is released from the workpiece. Rings 42, 43 may be omitted.

In FIG. 7 another modified form of the apparatus is shown. In this form, the widened slots 15 which receive the inserts 25 are located away from the slots 14 and 16. The slots 14 and 16 are continuations one of the other, and the slots 15 in which inserts 25 are disposed are disposed between these slots. The support body 20 is supported by inserts 25 in the same manner as in the other embodiments. Additional slots 16 may if desired be provided extending from the righthand ends of slots 15.

While preferred embodiments of the apparatus according to the invention have been described and shown in the drawings, many modifications thereof may be made by a person skilled in the art without departing from the spirit of the invention, and it is intended to protect by Letters Patent all forms of the invention falling within the scope of the following claims.

I claim:

1. Internal expanding collet clamp apparatus, comprising a tubular body having circular cross sections and having a plurality of circularly spaced longitudinal slots extending from one end thereof to form a plurality of collet elements at said one end thereof, the outer surfaces of said collet elements forming a segmented cylindrical surface and the inner surfaces of said collet elements forming a segmented conically tapered surface which reduces in diameter toward said one end, a support body disposed within said one end of said tubular body having a conically beveled outer surface slidably disposed against said inner surfaces of said collet elements, plural circularly spaced insert bodies disposed through openings through said tubular body adjacent the inner ends of said collet elements and fixedly yet releasably seated at their inner sides against said support body and their outer sides having means to fixedly seat against a surrounding support surface, whereby when said tubular body is moved axially in one direction with respect to said support body said collet elements are expanded and when said tubular body is moved axially in the opposite direction with respect to said support body said collet elements are retracted.

2. The combination of claim 1, said openings through which said insert bodies are disposed being disposed along said slots.

3. The combination of claim 1, said support body having a concentric cylindrical portion at its inner end against which said insert bodies are seated.

4. The combination of claim 1, said support body having a conically beveled portion at its inner end which is beveled opposite the direction of bevel of said beveled outer surface against which said collet elements are disposed, and against which said insert bodies are seated.

5. The combination of claim 1, said slots extending beyond said insert bodies, whereby the flexure necessary to expansion and retraction of said collet elements takes place over an increased length.

6. The combination of claim 5, said slots having intermediate widened portions through which said insert bodies are disposed.

7. The combination of claim 6, each said slot, collet element and insert body being identical with each other slot, collet element and insert body, respectively.

8. The combination of claim 7, said tubular body having connection means at its end opposite said one end thereof adapted for connection to a drawbar of a rotative machine tool.

9. The combination of claim 8, said support body having a concentric cylindrical portion at its inner end against which said insert bodies are disposed.

10. The combination of claim 8, said support body having a conically beveled portion at its inner end which is beveled opposite the direction of bevel of said beveled outer surface against which said collet elements are disposed, and against which said insert bodies are seated.

11. The combination of claim 8, each said insert body having an inwardly projecting lug engaging the inner end of said support body, said apparatus including a circular washer held against said lugs by a screw engaged in a tapped opening in said inner end of said support body to hold said insert bodies engaged with said support body.

12. The combination of claim 11, said support body having a concentric cylindrical portion at its inner end against which said insert bodies are seated.

13. The combination of claim 11, said support body having a conically beveled portion at its inner end which is beveled opposite the direction of bevel of said beveled outer surface against which said collet elements are disposed, and against which said insert bodies are seated.

14. The combination of claim 8, said insert bodies being connected to said support body by releasable connection means.

* * * * *